J. Peace,
Vise.
N°. 48,431. Patented June 27, 1865.
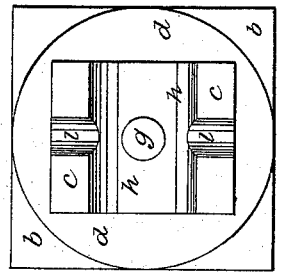
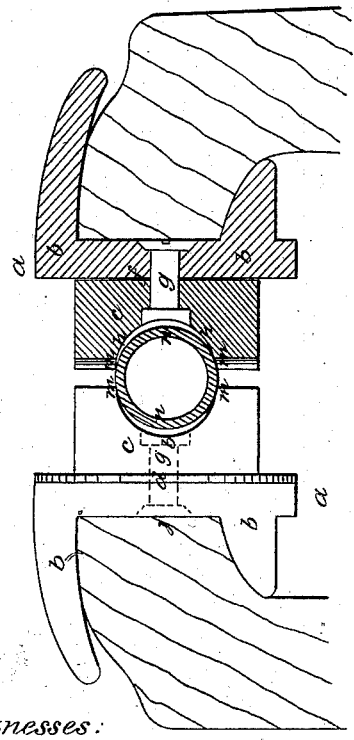
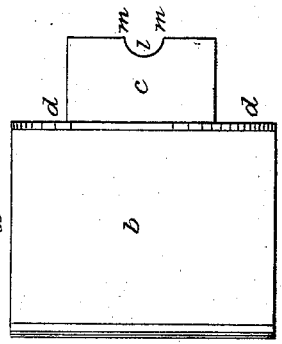
Witnesses:
Inventor:
John Peace

UNITED STATES PATENT OFFICE.

JOHN PEACE, OF CAMDEN, NEW JERSEY.

IMPROVED GAS-FITTER'S CLAMP.

Specification forming part of Letters Patent No. 48,431, dated June 27, 1865.

*To all whom it may concern:*

Be it known that I, JOHN PEACE, of Camden, in the county of Camden and State of New Jersey, have invented a new and useful Improvement in Pipe-Clamps for Gas-Fitters' Use; and I do hereby declare that the following is a full, clear, and exact description thereof, which will enable others skilled in the art to make and use the same, reference being had to the accompanying drawings, forming part of this specification.

The present invention consists in attaching to each jaw of an ordinary vise, so as to be readily removed therefrom at pleasure, and upon and over the nipping-surfaces thereof, a clip or secondary jaw-piece, made of iron or other suitable metal, to the outer faces of each of which, or those toward each other, a similar piece of metal made of a square or any other proper shape is attached in such a manner as to be easily turned around thereon at pleasure, which pieces have a similar segmental-shaped groove or grooves across their faces toward each other, in and by the edges of which, when the jaws are caused to move toward each other by the ordinary means, a pipe used for gas, steam, or any other purpose can be firmly held or griped and yet permit of its being moved about to the position the most convenient for operating upon the same.

In the accompanying plate of drawings my improvement is represented, Figure 1 being a half-section and side view, showing the manner in which a pipe is held in the same; Fig. 2, a top view of one-half of my improved clamp; and Fig. 3, a view of the grooved face of one of the segmental-grooved pieces.

$a\ a$ in the drawings represent my improved pipe-clamp; $b\ b$, its two clips or secondary jaws, made of proper shape to fit over the ordinary jaws of a vise, as represented by red lines in Fig. 1, and of iron or any other suitable metal; $c\ c$, square or other proper-shaped pieces of metal, either steel, iron, or any other metal which would be adapted thereto, attached to the faces $d$ and $f$ of the clips $b\ b$, toward each other, by means of a short shaft, $g$, free to turn within each clip. Across each square piece or block of metal $c\ c$, similar segmental-shaped grooves $h$ and $l$, of different sizes, are made, as seen in Fig. 3. Between the edges and corners $m\ m$, &c., of corresponding grooves of each segmental piece a gas, steam, or any other pipe, $n$, can be held by simply moving the jaws toward each other, as in ordinary vises. (See Fig. 1.)

From the above description it is apparent that by constructing the griping surfaces or parts of the vise so as to be easily turned around within the jaws thereof, as described, the pipe held between the same can thus be brought to any desired position, or the one most convenient for working upon the same.

Having thus described my invention, I claim and desire to secure by Letters Patent—

As an improved article of manufacture, a gas-fitter's clamp made substantially as herein shown and described.

JOHN PEACE.

Witnesses:
  RICHARD W. STICKNEY,
  JAMES M. CASSADY.